UNITED STATES PATENT OFFICE.

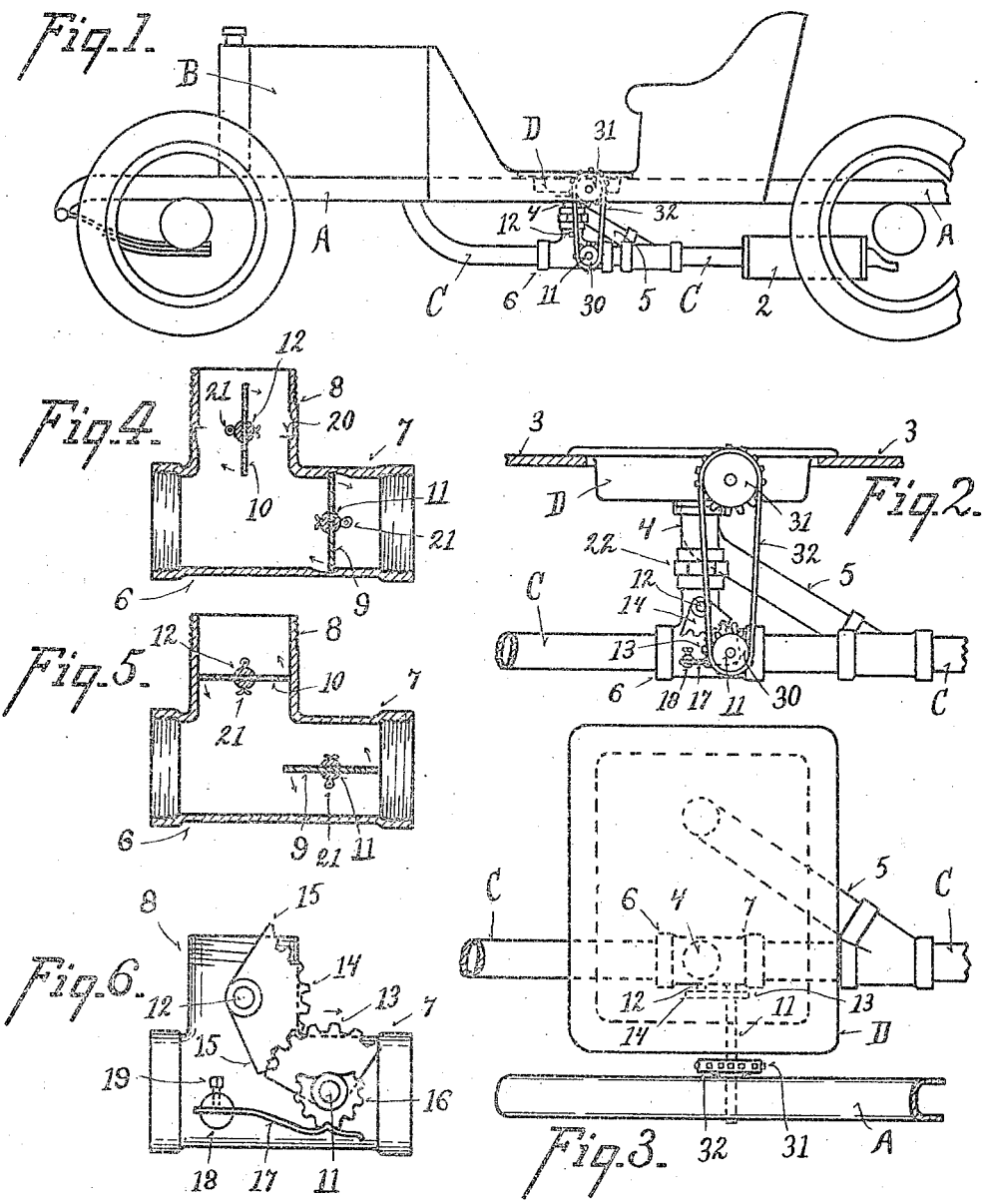

LEO A. BRIGEL, OF CHEVIOT, OHIO.

CONTROLLING MECHANISM FOR AUTOMOBILE-HEATERS.

1,159,566.  Specification of Letters Patent.  Patented Nov. 9, 1915.

Application filed March 4, 1912. Serial No. 681,556.

*To all whom it may concern:*

Be it known that I, LEO A. BRIGEL, a citizen of the United States, residing at Cheviot, in the county of Hamilton and State of Ohio, have invented certain new and useful Improvements in Controlling Mechanism for Automobile-Heaters, of which the following is a specification.

My invention relates to improvements in controlling mechanism for automobile heaters.

One of its objects is to provide improved valve mechanism adapted to be introduced in the motor exhaust pipe to control the flow of motor exhaust so as to direct all or part of said exhaust through a heater.

Another object is to provide improved means to reliably and conveniently operate said valve.

My invention further consists in certain details of form, combination and arrangement, all of which will be fully set forth in the description of the accompanying drawings, in which;

Figure 1 is a diagram in side elevation of an automobile with my improvements attached thereto. Fig. 2 is an enlarged side elevation of a heater with my improvements attached. Fig. 3 is a top plan view of the same. Fig. 4 is a central vertical section through the controlling valve detached. Fig. 5 is a view similar to Fig. 4 illustrating a modification. Fig. 6 is a side elevation of the controller valve detached with the sprocket wheel 30 detached.

The accompanying drawings illustrate the preferred embodiments of my invention.

A represents the frame of an automobile, B represents the housing in which the motor is contained, and C represents the motor exhaust pipe through which the motor exhaust which may be steam, but is usually the heated gases from a heat or explosion engine, is conducted usually through a muffler 2 and escapes into the air at the rear of the automobile. A heater D is let into the floor 3 of the automobile in position to warm the occupants thereof in cold weather, and is connected by means of a branch pipe 4 with the motor exhaust pipe C so that all or a portion of the heated exhaust gases may be directed from pipe C into said heater to secure the desired heating or warming effect. A pipe 5 leads from the heater to the pipe C at a point farther from the motor than the branch 4, to return the exhaust to the pipe C after passing through the heater.

In order to direct the exhaust gases from pipe C into the heater I preferably employ a valve having a T-shaped casing 6 in the exit branches 7 and 8 of which are pivotally supported valves 9 and 10, the stems 11 and 12 of which project outside the casing and are connected so as to move in unison. For this purpose I preferably employ two segmental gears 13, 14, one of which is provided with stop lugs 15 at opposite ends to limit the movement of the gears and valves. A toothed member 16 on the stem 11 is engaged by a spring 17 to hold the valves 9 and 10 to any adjusted position. The spring 17 is held in position in a slot in a boss 18 formed integral with the valve casing by means of a set screw 19.

As illustrated in Fig. 4 the valve casing is provided with off-sets or shoulders 20 adapted to be dressed by machinery, against which shoulders the faces of the valves 9 and 10 seat and make close joints when said valves are closed.

In the modification Fig. 5 the shoulders 20 are omitted and the valves when closed closely fit the bores of the branches 7 and 8. In order to secure the valves to their stems the stems 11 and 12 inside the valve casing are slotted and the valves, preferably in the form of disks of sheet metal are inserted in said slots and locked in place by means of cotter pins 21. I preferably provide the branch 8 of the valve casing with a male thread to which a union 22 is adapted to be attached to conveniently make connection with the heater within the limited space available, and to permit of readily detaching the heater during warm weather.

In order to reliably and conveniently operate the valves controlling the admission of hot gases to the heater I provide a sprocket or chain wheel 30 attached to the stem of one of the valves, say the stem 11. A sprocket wheel 31 is pivotally attached to the frame A, preferably on the inside of said frame piece so that the ends of the teeth of said wheel will project slightly above the said frame and the floor 3 so as to be readily engaged by the foot of the operator, who by engaging the sole of his shoe with said teeth is enabled to rotate the wheel 31 to the desired extent in either direction. The movement of the wheel 31 is transmitted to the wheel 30 and valves operatively connected thereto by means of a sprocket chain 32. The spring 17 locks the valves against accidental displacement in any position to which they may be adjusted. The valves 9 and 10 are set so that when one is fully open the other is fully closed, and so that any desired proportion of opening in the respective branches may be attained. The valve adjusting and transmission mechanism is extensible in nature and such as to be readily applied to various styles of automobiles, and is adapted to be readily and positively operated at all positions of the valves as the transmission mechanism has no dead centers or positions at which they are operated with more difficulty than at others, which would be liable to interfere with their adjustment to secure the desired amount of heat in the heater.

The mechanism herein illustrated and described is capable of considerable modification without departing from the principle of my invention.

Having described my invention, what I claim is:

1. In a controlling valve mechanism, a valve adapted to be introduced into the exhaust pipe of an automobile and provided with a branch pipe to lead to a heater, a sprocket wheel operatively connected with and adapted to control the movements of said valve to cut off or supply heated gases to said branch pipe, a sprocket wheel pivotally mounted with its teeth in position to be engaged by the foot of the operator, and a chain to transmit motion from one of said sprocket wheels to the other.

2. In a controlling valve mechanism, a heater, an exhaust pipe having a branch leading to said heater, a valve introduced into the exhaust pipe where it branches, a sprocket wheel mounted upon the stem of said valve and adapted to actuate said valve to control the supply of heated gases to said heater, a sprocket wheel pivotally mounted relative to the frame of said automobile with its teeth in position to be engaged by the foot of an operator, a chain to transmit motion from one of said sprocket wheels to the other, and mechanism to yieldingly lock said valve to different adjusted positions against accidental displacement.

3. In a controlling valve mechanism, a heater located in the floor of an automobile, an exhaust pipe having a branch leading to said heater, a valve introduced into the exhaust pipe where it branches and comprising a casing having an inlet and two exit branches, a valve pivotally supported in each of said exit branches, and transmitting mechanism operatively connecting said valves to cause them to move in unison and so as to close one of said exit branches when the other is open, a sprocket wheel operatively connected with and adapted to actuate said valves to control the supply of heated gases to said heater, a sprocket wheel pivotally mounted relative to the frame of said automobile with its teeth in position to be engaged by the foot of an operator, and a chain to transmit motion from one of said sprocket wheels to the other.

In testimony whereof I have affixed my signature in presence of two witnesses.

LEO A. BRIGEL.

Witnesses:
C. W. MILES,
W. THORNTON BOGERT.